United States Patent
Wang et al.

(10) Patent No.: US 12,038,311 B1
(45) Date of Patent: Jul. 16, 2024

(54) SELF-CORRECTING ASSEMBLABLE OPTICAL FIBER SENSING SYSTEM FOR DISPLACEMENT FIELD AND CORRECTION METHOD THEREOF

(71) Applicant: SHANDONG UNIVERSITY, Jinan (CN)

(72) Inventors: Zhengfang Wang, Jinan (CN); Jing Wang, Jinan (CN); Qingmei Sui, Jinan (CN); Lei Jia, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/487,278

(22) Filed: Oct. 16, 2023

(30) Foreign Application Priority Data

Jan. 6, 2023 (CN) .......................... 202310015493.5

(51) Int. Cl.
*G01D 5/38* (2006.01)
*G01B 11/16* (2006.01)
(Continued)

(52) U.S. Cl.
CPC ............... *G01D 5/38* (2013.01); *G01B 11/16* (2013.01); *G01B 11/165* (2013.01); *G01B 11/24* (2013.01);
(Continued)

(58) Field of Classification Search
CPC ....................................................... G01D 5/38
(Continued)

(56) References Cited

U.S. PATENT DOCUMENTS 10,852,132 B1 * 12/2020 Zhang ..................... G01C 9/06
11,486,777 B2 * 11/2022 Kim ...................... G01L 5/0061
(Continued)

FOREIGN PATENT DOCUMENTS

CN 101539408 A 9/2009
CN 102175185 A * 9/2011 ............. G01B 11/26
(Continued)

OTHER PUBLICATIONS

CNIPA, Notification of a First Office Action for CN202310015493.5, Apr. 11, 2023.
(Continued)

*Primary Examiner* — Michelle M Iacoletti
*Assistant Examiner* — Noah J. Haney
(74) *Attorney, Agent, or Firm* — Zhigang Ma

(57) ABSTRACT

A self-correcting assemblable optical fiber sensing system for a displacement field and a correction method thereof are provided. The system includes multiple assemblable flexible optical fiber sensing devices for measuring displacement field; multiple inclination angle self-sensing connection devices for connecting between assemblable flexible optical fiber sensing devices, and an optical fiber demodulation device for obtaining strain data of the assemblable flexible optical fiber sensing devices and two-axis inclination angle data of the inclination angle self-sensing connection devices, and correcting the displacement field measured by the assemblable flexible optical fiber sensing devices. The assemblable flexible optical fiber sensing devices are connected between the inclination angle self-sensing connection devices, and the optical fiber demodulation device is connected to a free end of the inclination angle self-sensing connection device. In this situation, two-dimensional displacement field monitoring of the large-scale structure can be realized.

6 Claims, 6 Drawing Sheets

(51) Int. Cl.
*G01B 11/24* (2006.01)
*G01B 11/26* (2006.01)
*G01C 9/00* (2006.01)
*G01L 1/24* (2006.01)
*G01M 11/08* (2006.01)

(52) U.S. Cl.
CPC ............... G01B 11/26 (2013.01); G01C 9/00 (2013.01); G01L 1/246 (2013.01); G01M 11/088 (2013.01)

(58) Field of Classification Search
USPC .......................................... 702/150; 356/73.1
See application file for complete search history.

(56) References Cited

U.S. PATENT DOCUMENTS

| | | | | |
|---|---|---|---|---|
| 2006/0139626 A1* | 6/2006 | Childers | ................... | G01C 9/06 356/138 |
| 2009/0201503 A1* | 8/2009 | Bennion | .............. | G01M 11/088 356/370 |
| 2010/0215311 A1* | 8/2010 | Moore | .................. | G01B 11/18 356/73.1 |
| 2017/0153155 A1* | 6/2017 | Hull | ........................ | F17C 13/02 |
| 2023/0147800 A1* | 5/2023 | Hanzawa | ............... | G01N 21/47 356/601 |

FOREIGN PATENT DOCUMENTS

| | | | | | |
|---|---|---|---|---|---|
| CN | 110657753 A | * | 1/2020 | ............ | G01B 11/18 |
| CN | 111322966 A | * | 6/2020 | ............ | G01B 11/26 |
| CN | 112393686 A | * | 2/2021 | ............ | G01B 11/02 |
| CN | 213208933 U | | 5/2021 | | |
| CN | 113358047 A | * | 9/2021 | ............ | G01D 21/02 |
| CN | 215338185 U | * | 12/2021 | ............ | G01B 11/02 |
| JP | 2002340522 A | | 11/2002 | | |
| WO | WO-2016209099 A1 | * | 12/2016 | ............ | G01D 11/30 |

OTHER PUBLICATIONS

Shandong University (Applicant), Reply to Notification of a First Office Action for CN202310015493.5, w/ (allowed) replacement claims, Apr. 23, 2023.
CNIPA, Notification to grant patent right for invention in CN202310015493.5, Aug. 25, 2023.

* cited by examiner

SELF-CORRECTING ASSEMBLABLE OPTICAL FIBER SENSING SYSTEM FOR DISPLACEMENT FIELD AND CORRECTION METHOD THEREOF

CROSS-REFERENCE OF RELATED APPLICATION

This application claims priority to a Chinese patent application No. CN202310015493.5, filed on Jan. 6, 2023. The entire content of the above-mentioned application is hereby incorporated by reference.

TECHNICAL FIELD

The disclosure relates to the field of engineering structure deformation monitoring technologies, and more particularly to a self-correcting assemblable optical fiber sensing system for a displacement field and a correction method thereof.

BACKGROUND

With the development of economy, in the construction and operation process of large engineering structures, including tunnel section deformation, slope sliding, bridge deflection and so on, it is necessary to monitor the distribution of displacement field of key areas in real time. However, the existing point displacement measurement technology can only obtain displacement information of location of a sensing device arrangement, but cannot obtain displacement field information of the key areas (such as global convergence of tunnels, vertical displacement of slope, deflection, vertical settlement), which is easy to cause omission of key information in the spatial dimension. Although total station and three-dimensional laser scanner can model the displacement field on the surface of the above infrastructure, it is difficult to obtain change information of internal displacement field, and it belongs to periodicity detection, which is difficult to ensure real-time monitoring in the time dimension. Therefore, real-time sensing technology of large-scale displacement field is needed.

Optical fiber is soft in material and can realize (quasi-)distributed networking, so that the optical fiber is convenient to be combined with a substrate and sense the deformation of multiple points of the substrate using use one optical fiber. For a long time, the shape sensing technology based on optical fiber has been a research hotspot. The optical fiber is pasted or embedded into the substrate, and the strain at each point is measured, which in turn deduce the overall deformation of the material to realize the perception of displacement field. The above technology has achieved ideal results in the field of medical treatment and small structural parts.

However, in the monitoring of displacement field of key areas of large-scale infrastructure projects, the measured area is large, the distance is long, and the coverage of the sensing device can reach tens of meters. Under such conditions, the optical fiber shape sensing device used for deformation field sensing is large in size, which directly makes it difficult to install the sensing device in the project, and easily causes the breakpoint of the optical fiber, resulting in the damage of the sensing device. More importantly, long-distance displacement sensing is prone to serious accumulative error phenomenon, the longer the distance, the more complex the change form, the greater the accumulative error, and it is extremely difficult to correct, which directly affects the measurement accuracy of the sensing device. The above problems have become a bottleneck problem restricting the application and promotion of long-distance optical fiber shape sensing device in large-scale infrastructure projects.

SUMMARY

In order to solve the technical problems, the disclosure provides a self-correcting assemblable optical fiber sensing system for a displacement field and a correction method thereof. Based on assemblable flexible optical fiber sensing devices, not only the cumulative deformation of the structure can be monitored, but also the flexible optical fiber sensing devices with suitable splicing length can be assembled independently according to the size of the large-scale structure. Connection devices with inclination angle sensing modules can not only monitor the inclination and torsion changes of the structure, but also correct and compensate the deformation measured by the flexible optical fiber sensing devices, so as to realize more accurate displacement field monitoring of large-scale structures.

In an aspect, the disclosure provides a self-correcting assemblable optical fiber sensing system for displacement field, including: multiple assemblable flexible optical fiber sensing devices, multiple inclination angle self-sensing connection devices and an optical fiber demodulation device.

The assemblable flexible optical fiber sensing device is configured (i.e., structured and arranged) to measure torsion information and displacement field.

The inclination angle self-sensing connection device is configured to connect the assemblable flexible optical fiber sensing devices and measure an inclination angle and a torsion angle at a connection position of the assembled flexible optical fiber sensing devices.

The optical fiber demodulation device is configured to acquire strain data of the assemblable flexible optical fiber sensing devices and data of the inclination angle and the torsion angle measured by the inclination angle self-sensing connection devices, and correct the displacement field measured by the assemblable flexible optical fiber sensing devices.

The multiple assemblable flexible optical fiber sensing devices are connected between the multiple inclination angle self-sensing connection devices, and the optical fiber demodulation device is connected to a free end of the inclination angle self-sensing connection devices.

In an embodiment, the assemblable flexible optical fiber sensing device includes a protruding connector, a connecting groove, fixing slots, optical fiber joint accommodating slots, optical fiber slots, an optical fiber channel and first optical fiber leading-out holes.

The protruding connector and the connecting groove are respectively located at two ends of the assemblable flexible optical fiber sensing device, and the protruding connector is adapted to the connecting groove.

The assemblable flexible optical fiber sensing device is provided with three the optical fiber slots at equal intervals along a circumferential direction, and an inner center of the assemblable flexible optical fiber sensing device is provided with the optical fiber channel.

The two ends of the assemblable flexible optical fiber sensing device are respectively symmetrically provided with the fixing slots and the first optical fiber leading-out holes, and the fixing slots are symmetrically distributed based on the optical fiber channel.

The optical fiber slot is internally embedded with a strain sensing optical fiber, and the strain sensing optical fiber is sealed with epoxy resin and is configured to monitor displacement information and torsion information of the assemblable flexible optical fiber sensing device.

Two ends of the optical fiber slot are provided with the optical fiber joint accommodating slots, and a depth of the optical fiber joint accommodating slot is greater than that of the optical fiber slot.

The optical fiber channel is internally provided with a temperature compensation optical fiber; the temperature compensation optical fiber is in a loose state and is not affected by strain, and is configured to perform temperature compensation on the strain sensing optical fiber.

In an embodiment, the inclination angle self-sensing connection device includes: fixing protrusions, a sensing device fixing channel, fixing members and an inclination angle self-sensing module.

The inclination angle self-sensing connection device is internally provided with the sensing device fixing channel, the fixing protrusions are symmetrically arranged on two sides of the sensing device fixing channel, and the fixing protrusions are matched with the fixing slots respectively.

The fixing members are located at two ends of the inclination angle self-sensing connection device and configured to fix the assemblable flexible optical fiber sensing device inside the inclination angle self-sensing connection device.

The inclination angle self-sensing module is located at one side of the inclination angle self-sensing connection device, and is configured to measure the data of the inclination angle and the data of the torsion angle at the connection position of the assemblable flexible optical fiber sensing devices. In an embodiment, the inclination angle self-sensing module includes a cavity, a surface of the cavity is provided with second optical fiber leading-out holes, and the cavity is provided with an optical fiber fixing sub-device on a top of an inner side of the cavity.

The optical fiber fixing sub-device is connected to an end of a multi-core optical fiber, and another end of the multi-core optical fiber is fixedly connected to a counterweight sub-device, and the counterweight sub-device is configured to increase bending amplitude of the multi-core optical fiber when the multi-core optical fiber is inclined.

In an embodiment, the multi-core optical fiber includes a central core and multiple outer cores, and fiber gratings engraved at same positions of all of the central core and the multiple outer cores.

The fiber grating at the position of the central core is configured to perform temperature compensation.

Two of the fiber gratings at the positions of the multiple outer cores are arbitrarily selected to be not in a straight line with the central core and are configured to acquire the torsion angle and the inclination angle between the assemblable flexible optical fiber sensing devices after assembled.

The torsion angle is represented as:

$$\phi = \tan^{-1}\left(\frac{\frac{\Delta\lambda_i}{\lambda_i}\sin\phi_j - \frac{\Delta\lambda_j}{\lambda_j}\sin\phi_i}{\frac{\Delta\lambda_j}{\lambda_j}\cos\phi_i - \frac{\Delta\lambda_i}{\lambda_i}\cos\phi_j}\right),$$

where $\lambda_i$ represents a Bragg wavelength of a core i of the multi-core optical fiber, $\phi_i$ represents an angle position of the core i relative to a neutral surface, and a phase between $\phi_j$ and $\phi_i$ is any value except $\pi$.

The inclination angle is represented as:

$$\theta = \sin^{-1}\left[\left(\frac{\Delta\lambda_i}{\lambda_i}\frac{1}{1-p_e}\frac{1}{\sin(\phi+\phi_i)} - \frac{d}{R_{Fiber}}\right) \times \frac{EI}{(dmg(x_g - L)}\right],$$

where $\theta$ represents the inclination angle of the assembled flexible optical fiber sensing device, $\lambda_i$ represents the Bragg wavelength of the core i of the multi-core optical fiber, $\phi_i$ represents the angle position of the core i relative to the neutral surface, $\phi$ represents the torsion angle between the assembled flexible optical fiber sensing devices, R represents a bending radius, E represents a Young's modulus of the multi-core optical fiber, I is a second-order moment of a cross-sectional area, L represents a length of a free fiber, $x_g$ represents a distance from the fiber grating to a fixed point, m represents a weight of an additional counterweight ball, g represents gravitational acceleration, and d represents a distance from the outer core to the central core.

In another aspect, in order to achieve the above purposes, the disclosure provides a correction method of the self-correcting assemblable optical fiber sensing system for the displacement field, including:
constructing an error compensation database of a single one of the assemblable flexible optical fiber sensing devices;
based on the error compensation database, performing error compensation on a two-dimensional coordinate curve fitted by each of the assemblable flexible optical fiber sensing devices and performing independent correction on a displacement curve fitted by each of the assemblable flexible optical fiber sensing devices; and
assembling the multiple assemblable flexible optical fiber sensing devices, the multiple inclination angle self-sensing connection devices, and the optical fiber demodulation device based on a preset manner, acquiring the data of the inclination angle and the torsion angle measured by the inclination angle self-sensing connection devices through the optical fiber demodulation device after assembled, and performing whole correction on multiple coordinate curves fitted by the assemblable flexible optical fiber sensing devices after assembled.

In an embodiment, the constructing an error compensation database of a single one of the assemblable flexible optical fiber sensing devices includes:
constructing a deformation database without torsion of the assemblable flexible optical fiber sensing devices;
constructing the error compensation database based on the deformation database.

The constructing a deformation database without torsion of the assemblable flexible optical fiber sensing devices includes:
performing a preset deformation treatment on the assemblable flexible optical fiber sensing devices before measurement, and constructing the deformation database of each of the assemblable flexible optical fiber sensing devices based on a result of the preset deformation treatment without torsion subjected to the assemblable flexible optical fiber sensing devices.

The preset deformation processing includes: dividing deformation of the assemblable flexible optical fiber sensing devices into three kinds of boundary constraint conditions including single-end fastening, double-end fastening and double-end simply supported; and under each of the boundary constraint conditions, considering situations of single-point multi-value loading, two-point multi-value loading and three-point multi-value loading of a central point and an eccentric point, calculating original curvature data $$\kappa = \sum_{i=1}^{3} \frac{\varepsilon_i}{r} \cos\theta_i j + \sum_{i=1}^{3} \frac{\varepsilon_i}{r} \sin\theta_i k$$

under different loading situations according to the strain data.

The constructing the error compensation database based on the deformation database includes:
  obtaining the two-dimensional coordinate curve of the assemblable flexible optical fiber sensing device by using a two-dimensional coordinate reconstruction algorithm for the original curvature data in the deformation database, and calculating coordinate curve error data of the assemblable flexible optical fiber sensing device; performing interpolation on the original curvature data and the coordinate curve error data of different deformation types respectively according to loading displacement to form a data volume with a preset value, and making the coordinate curve error data correspond to the original curvature data of various deformations in the deformation database to thereby establish the error compensation database.

In an embodiment, the correction method includes performing the error compensation on curvature data including:
  performing derivation on the curvature data measured by the assemblable flexible optical fiber sensing devices after assembled with the original curvature data in the deformation database to obtain a derivative curve, take a positive and negative matching degree and an Euclidean distance of the obtained derivative curve as an objective function, searching a curvature curve with a most matched deformation shape from the error compensation database by using a gradient descent algorithm, and performing the error compensation on data of the measured coordinate curves according to the corresponding coordinate curve error data in the error compensation database, so as to correct the plurality of coordinate curves fitted by the assemblable flexible optical fiber sensing devices.

In an embodiment, data of the two-axis inclination angle measured by the inclination angle self-sensing connection devices includes: $\theta_1$, $\phi_1$, $\theta_2$, $\phi_2$, $\theta_3$, $\phi_3$ . . . ; where $\theta$ represents an included angle between the connection position of the assemblable flexible optical fiber sensing device and a horizontal plane, $\phi$ represents the torsion angle of the connection position of the assemblable flexible optical fiber sensing devices, and 1, 2, 3 . . . represents a first inclination angle self-sensing connection device, a second inclination angle self-sensing connection device, a third inclination angle self-sensing connection device . . . , respectively.

In an embodiment, the method further includes based on a preset correction mode, performing torsion error correction and curve splicing on the plurality of coordinate curves fitted by the assemblable flexible optical fiber sensing devices after assembled using the torsion angle $\phi$ and inclination angle $\theta$ at the connection position of the assemblable flexible optical fiber sensing devices, including:
  step S1, for a first assemblable flexible optical fiber sensing device, when the first assemblable flexible sensing device is subjected to torsion, calculating a set $N_1$ of torsion data $\phi$ evenly distributed along an arc length of the first assemblable flexible optical fiber sensing device from strain data of three strain sensing optical cables in the optical fiber slots; where the set $N_1$ is a torsion data set from zero, a total variation of the torsion data of the first assemblable flexible optical fiber sensing device is represented as an end value $N_{1end}$ of the torsion data set $N_1$; obtaining a corrected torsion data set $$N_1 \frac{\phi_2 - \phi_1}{N_{1end}}$$

with an accurate total torsion variation by using a difference value $\phi_2 - \phi_1$ of the torsion angles $\phi_1$ and $\phi_2$ measured by the inclination angle self-sensing connection devices at two ends of the first assemblable flexible optical fiber sensing device as a reference of the total variation $N_{1end}$, adding the torsion angle $\phi_1$ to the corrected torsion data set $$N_1 \frac{\phi_2 - \phi_1}{N_{1end}}$$

and taking the torsion angle $\phi_1$ as an initial reference value of the torsion data set, so as to obtain a first accurate torsion angle data set $$N_1 \frac{\phi_2 - \phi_1}{N_{1end}} + \phi_1$$

of the first assemblable flexible optical fiber sensing device, calculating curvature data $\kappa =$ $$\frac{\left(r \frac{\sqrt{(r\varphi)^2 + l_0^2}}{\varphi} \kappa \cdot \sin\frac{\varphi}{2}\right)^*}{r \frac{\sqrt{(r\varphi)^2 + l_0^2}}{\varphi} \cdot \sin\frac{\varphi}{2}}$$

of the first assemblable flexible optical fiber sensing device separating a torsion error by using the torsion data $\varphi$ in the first accurate torsion angle data set $$N_1 \frac{\phi_2 - \phi_1}{N_{1end}} + \phi_1;$$

translating a starting point of a first fitted coordinate curve to a coordinate origin through the curvature data $\kappa$, and rotating the translated coordinate curve around the coordinate origin through an optimization algorithm until a tangent angle of the starting point is close to the inclination angle $\theta_1$ measured by the inclination angle self-sensing connection device, taking a difference value between a tangent angle at an end of the first fitted coordinate curve and the inclination angle $\theta_2$ as an objective function; setting a variation range of a correction coefficient X1 according to different bending conditions by the first assemblable flexible optical fiber sensing device, and then randomly selecting a value from the variation range as an initial value of the correction coefficient X1, multiplying the initial value by a strain curve of the first assemblable flexible optical fiber sensing device, updating the correction coefficient X1 of the strain curve by using an optimization algorithm by taking a value of the inclination angle $\theta_2$ measured in real time as an optimization objective, until the tangent angle at the end of the first fitted coordinate curve is close to the inclination angle $\theta_2$ measured at an end of the first assemblable flexible optical fiber sensing device, so as to complete correction of the first fitted coordinate curve;

step S2, for a second assemblable flexible optical fiber sensing device, obtaining a torsion data set $$N_2 \frac{\phi_3 - \phi_2}{N_{2end}} + \phi_2$$

of the second assemblable flexible optical fiber sensing device by using the torsion angles $\phi_2$ and $\phi_3$ through operations of the step S1, calculating a curvature data $\kappa$ corresponding to the second assemblable flexible optical fiber sensing device, to fit a second coordinate curve; translating and splicing a starting point of the second coordinate curve to an end point of the first fitted coordinate curve, and rotating and adjusting a curvature correction coefficient X2 simultaneously to make tangent angles at a start point and an end of the second coordinate curve are close to the inclination angles $\theta_2$ and $\theta_3$ measured by the inclination angle self-sensing connection devices at both ends of the second assemblable flexible optical fiber sensing device, so as to complete correction of the second coordinate curve; and step S3, aiming at the coordinate curves of the assemblable flexible optical fiber sensing devices, sequentially adopting the algorithms of torsion error correction and optimization of rotation splicing matching curvature correction coefficient adjustment in the step S1, and finally forming an overall displacement curve measured by the assemblable flexible optical fiber sensing devices after assembled.

Compared with the related art, the disclosure has the following advantages and technical effects as follows.

1. The sensing device can be assembled in multiple sections, which is suitable for displacement field monitoring in different measurement ranges.
2. The sensing device in each section is standardized and the deformation can be calibrated. Through the typical displacement calibration of each section, the displacement error compensation database in the section is established, and the error compensation is carried out during the measurement process to ensure the displacement measurement accuracy of the sensing device in each section.
3. The displacement field is self-corrected by installing the inclination angle self-sensing connection device at the connection position to improve the long-distance measurement accuracy and reduce the accumulative error.
4. Through multi-section splicing, it is easy to carry and install.

BRIEF DESCRIPTION OF DRAWINGS

The accompanying drawings, which are incorporated in and constitute a part the disclosure, are intended to provide a further understanding of the disclosure, and illustrative embodiments of the disclosure and description thereof are for the purpose of illustrating the disclosure, which are not intended to unduly limit the disclosure.

FIG. 7A illustrates the schematic diagram of the inclination angle self-sensing module in an open state, and FIG. 7B illustrates the schematic diagram of the inclination angle self-sensing module in a closed state.

DESCRIPTION OF REFERENCE SIGNS

Figure 1:
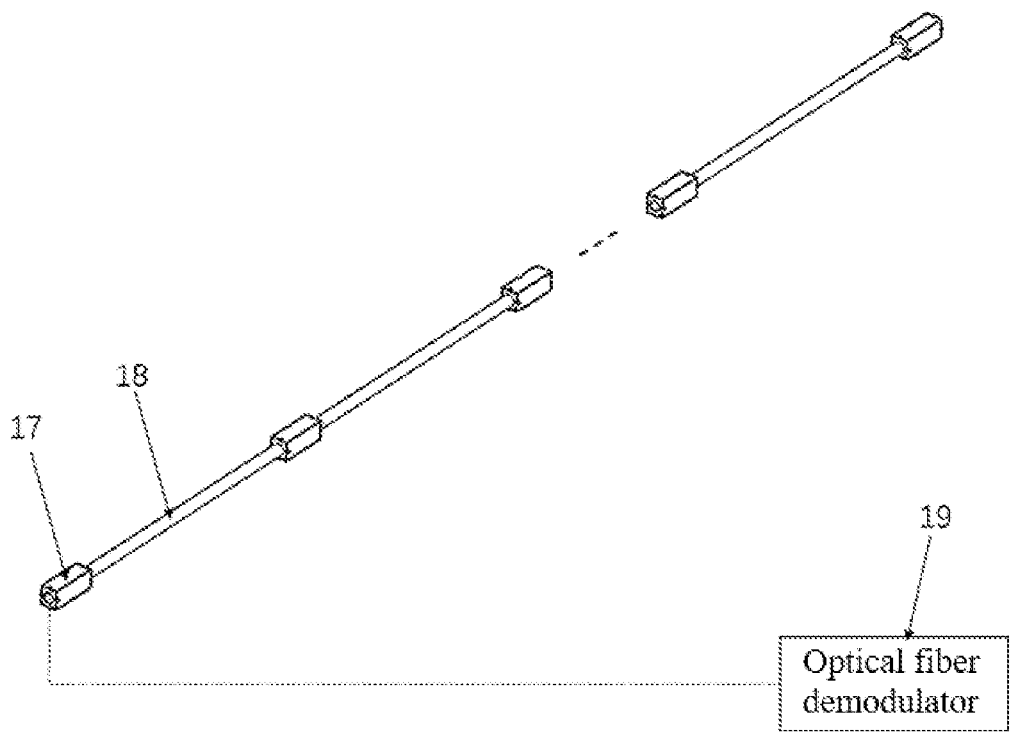
FIG. 1 illustrates a schematic structural diagram of a self-correcting assemblable optical fiber sensing system for a displacement field according to an embodiment 1 of the disclosure.
Figure 2:
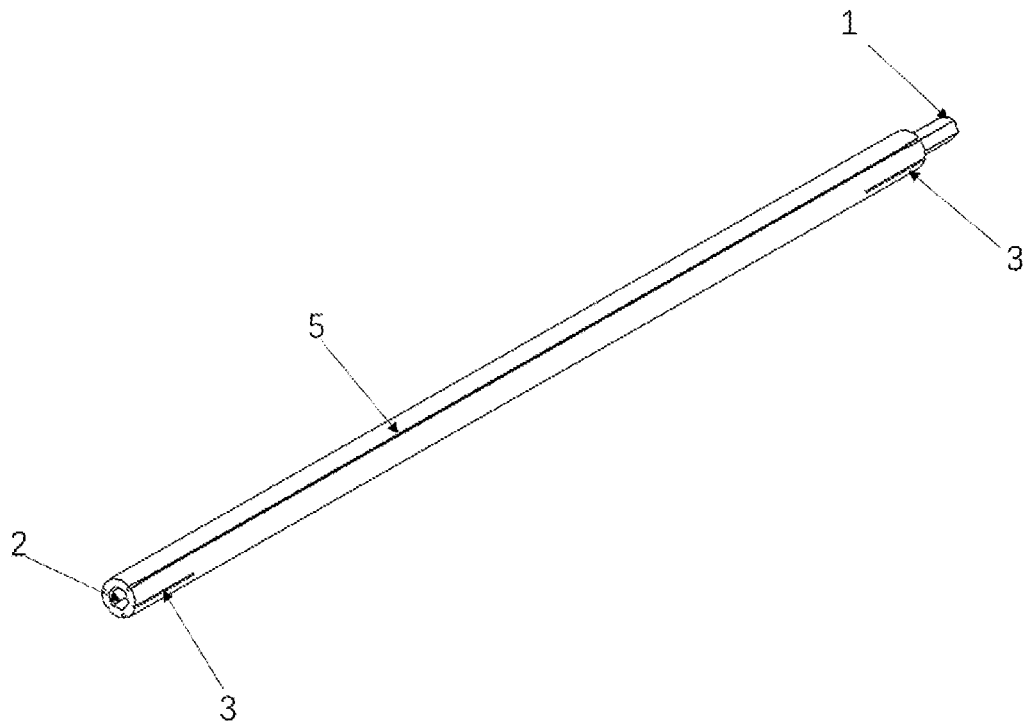
FIG. 2 illustrates a schematic structural diagram of an assemblable flexible optical fiber sensing device according to the embodiment 1 of the disclosure.
Figure 3:
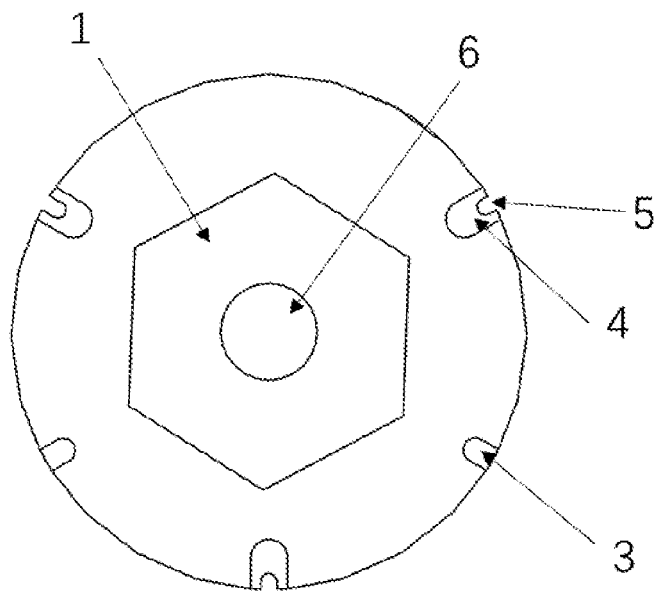
FIG. 3 illustrates a right-side view of the assemblable flexible optical fiber sensing device according to the embodiment 1 of the disclosure.
Figure 4:
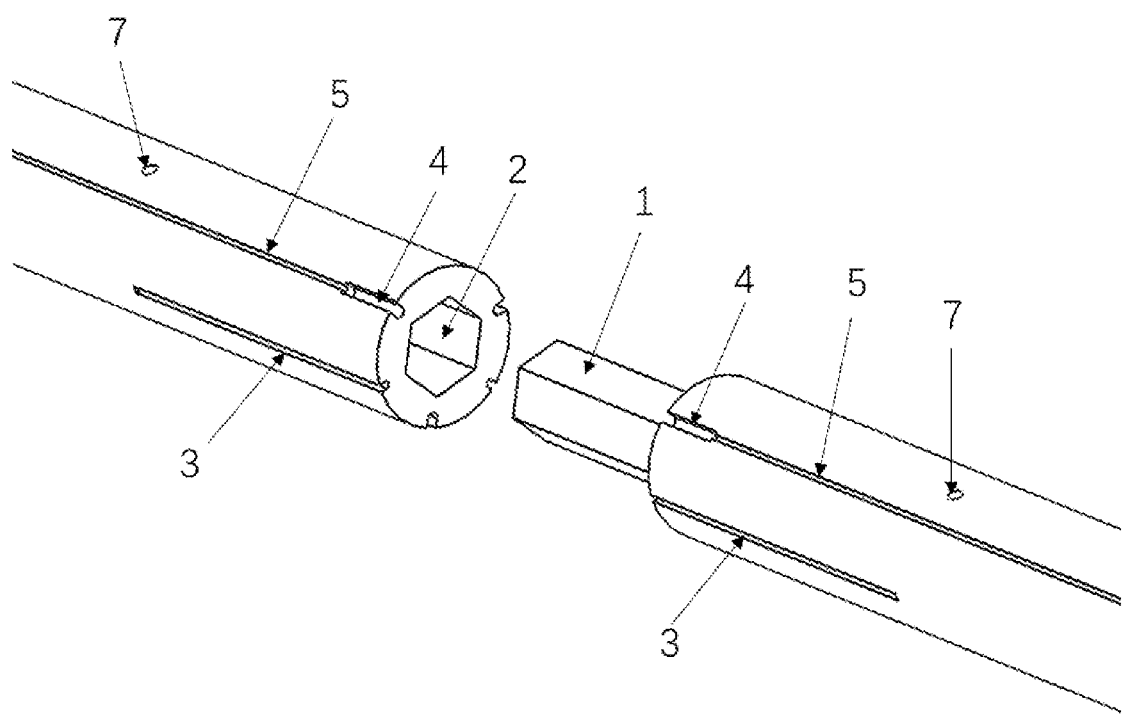
FIG. 4 illustrates a schematic structural diagram of connection of two sections of the assembled flexible optical fiber sensing devices according to the embodiment 1 of the disclosure.

1. hexagonal boss (also referred to as protruding connector); 2. hexagonal groove (connecting groove); 3. fixing slot; 4. optical fiber joint accommodating slot; 5. optical fiber slot; 6. circular hole channel (also referred to as optical fiber channel); 7. first optical fiber leading-out hole; 8. fixing protrusion; 9. sensing device fixing channel; 10. fixing sub device (also referred to as fixing member); 11. inclination angle self-sensing module; 12. shell structure; 13. optical fiber fixing sub device; 14. multi-core optical fiber; 15. counterweight sub device; 16. second optical fiber leading-out hole; 17. inclination angle self-sensing connection device; 18. assemblable flexible optical fiber sensing device; and 19. optical fiber demodulation device (also referred to as optical fiber demodulator).

DETAILED DESCRIPTION OF EMBODIMENTS

It should be noted that illustrated embodiments and features in the illustrated embodiments in the disclosure can be combined with each other without conflict. The disclosure will be described in detail below with reference to the accompanying drawings and in combination with the illustrated embodiments.

It should be noted that steps illustrated in a flowchart of the accompany drawings may be performed in a computer system such as a set of computer executable instructions, and although a logical order is shown in the flowchart, in some cases, the steps shown or described may be performed in a different order than herein.

Embodiment 1

The disclosure provides a self-correcting assemblable optical fiber sensing system for a displacement field. The self-correcting assemblable optical fiber sensing system for the displacement field includes: assemblable flexible optical fiber sensing devices, inclination angle self-sensing connection device, and an optical fiber demodulation device (also referred to as optical fiber demodulator).

The assemblable flexible optical fiber sensing device is configured to measure the displacement field.

The inclination angle self-sensing connection device is configured to connect the assemblable flexible optical fiber sensing devices and measure an inclination angle and a torsion angle between the assemblable flexible optical fiber sensing devices. The optical fiber demodulation device is configured to acquire strain data of the assemblable flexible optical fiber sensing devices and data of the inclination angle and the torsion angle of the inclination angle self-sensing connection devices, and correct the displacement field measured by the assemblable flexible optical fiber sensing devices after assembled.

Multiple assemblable flexible optical fiber sensing devices are connected between multiple inclination angle self-sensing connection devices, and the optical fiber demodulator is connected to a free end of the inclination angle self-sensing connection devices.

In an embodiment, the assemblable flexible optical fiber sensing device includes: a protruding connector, a connecting groove, fixing slots, optical fiber joint accommodating slots, optical fiber slots, an optical fiber channel, and first optical fiber leading-out holes.

The protruding connector and the connecting groove are respectively located at two ends of the assemblable flexible optical fiber sensing device, and the protruding connector is adapted to the connecting groove.

The assemblable flexible optical fiber sensing device is provided with three optical fiber slots at equal intervals along a circumferential direction, and an internal center of the assemblable flexible optical fiber sensing device is provided with the optical fiber channel.

The two ends of the assemblable flexible optical fiber sensing device are respectively symmetrically provided with the fixing slots and the first optical fiber leading-out holes, and the fixing slots are symmetrically distributed based on the optical fiber channel.

The optical fiber slot is internally embedded with a strain sensing optical fiber, and the strain sensing optical fiber is sealed with epoxy resin.

The optical fiber channel is internally provided with a temperature compensation optical fiber, the temperature compensation optical fiber is in a loose state and is not affected by strain, and is configured to perform temperature compensation on the strain sensing optical fiber.

Two ends of the optical fiber slot are provided with the optical fiber joint accommodating slots, and a depth of the optical fiber joint accommodating slot is greater than that of the optical fiber slot.

In an embodiment, the inclination angle self-sensing connection device includes: fixing protrusions, a sensing device fixing channel, fixing members and an inclination angle self-sensing module.

The inclination angle self-sensing connection device is internally provided with the sensing device fixing channel, the fixing protrusions are symmetrically arranged on two sides of the sensing device fixing channel, and the fixing protrusions are matched with the fixing slots respectively.

The fixing members are located at two ends of the inclination angle self-sensing connection device and configured to fix the assemblable flexible optical fiber sensing device inside the inclination angle self-sensing connection device.

The inclination angle self-sensing module is located at one side of the inclination angle self-sensing connection device and is configured to measure data of the inclination angle at the connection position of the assemblable flexible optical fiber sensing devices.

In an embodiment, the inclination angle self-sensing module includes a cavity, a surface of the cavity is provided with second optical fiber leading-out holes, and the cavity is provided with an optical fiber fixing sub-device on a top of an inner side of the cavity.

The optical fiber fixing sub-device is connected to an end of a multi-core optical fiber, and another end of the multi-core optical fiber is fixedly connected to a counterweight sub-device, and the counterweight sub-device is configured to increase bending amplitude of the multi-core optical fiber when the assemblable flexible optical fiber sensing device is inclined.

In an embodiment, the multi-core optical fiber includes a central core and multiple outer cores, and fiber gratings engraved at same positions of all fiber cores.

The fiber grating at the position of the central core is configured to perform temperature compensation.

Two of the fiber gratings at the positions of the multiple outer cores are arbitrarily selected to be not in a straight line with the central core and are configured to acquire the inclination angle between the assemblable flexible optical fiber sensing devices after assembled.

In this embodiment, as shown in FIG. 1, a self-correcting assemblable optical fiber sensing system for displacement field includes an optical fiber demodulator 19, assemblable flexible optical fiber sensing devices 18, and inclination angle self-sensing connection devices 17. The assemblable flexible optical fiber sensing devices 18 use a two-step correction method to solve the problem of accumulative error. Firstly, each section of the assemblable flexible optical fiber sensing devices 18 independently measures displacement data, and uses the typical deformation classification correction method to primarily correct the displacement error in a small range. Secondly, the inclination angle self-sensing connection devices 17 are used to connect the multiple assemblable flexible optical fiber sensing devices 18 with different lengths, and the inclination angle change and torsion angle change of the connection position are accurately measured, and secondary integral error correction is carried out on the long-distance optical fiber displacement sensing system after assembled according to the inclination angle information and the torsion information of the connection position.

In this embodiment, as shown in FIGS. 1-4, the assemblable flexible optical fiber sensing device includes a hexagonal boss 1 (also referred to as protruding connector), a hexagonal groove 2 (also referred to as connecting groove), fixing slots 3, optical fiber joint accommodating slots 4, optical fiber slots 5, a circular hole channel 6 (also referred to as optical fiber channel), and first optical fiber leading-out holes 7. The sensing device is made of fiber composite materials or thermoplastic materials that are easy to process and form, with the main shape of an elongated tubular hollow structure. The circular hole channel 6 can accommodate the temperature compensation optical fiber and other optical fiber transmission lines to protect the optical fiber. Two first optical fiber leading-out holes 7 connected to the internal channel are reserved on both sides of the sensing device to facilitate the connection between the joint leading out the transmission optical fiber and the built-in inclination angle self-sensing module 11 of the connection device 17. A hexagonal boss 1 is provided at the end of the sensing device, and a hexagonal groove 2 is provided at the starting section, which allows the sensing devices can be butted through a mortise and tenon structure to ensure that there is no torsion between the sensing devices. Two ends of the sensing device are engraved with fixing slots 3, which can be embedded in the axial fixing protrusions 8 on the inner side of the connection device when the sensing device is butted with the inclination angle self-sensing connection device 17 to ensure that the inclination angle self-sensing connection device 17 and the assemblable flexible optical fiber sensing device 18 are fixed without rotation. The assemblable flexible optical fiber sensing device 18 has circumferentially equally distributed elongated fiber optical slots 5 with strain sensing fibers embedded inside and sealed with epoxy resin to ensure that the fibers are coupled to the rod-shaped substrate. To facilitate the placement of the optical fiber joint, deeper optical fiber joint accommodating slots 4 are provided at both ends of the fixing slot 3. When the rod-shaped substrate undergoes bending deformation and torsion, the optical fiber will be stretched and compressed, and then the measured strain data is used to fit the coordinate curve of the flexible optical fiber sensing device.

Three strain sensing optical fibers are symmetrically distributed at an interval of 120°, and the distance between the strain sensing optical fiber and the center of the flexible optical fiber sensing device is r. When the optical fiber is subjected to planar bending with equal curvature at all positions, it is assumed that the center angle corresponding to the bending is $\beta$ and the curvature radius corresponding to the neutral axis of the sensing device is $R_0$, the included angle between the connection line between the neutral axis and the eccentric strain sensing optical fiber and the normal line of the bending plane is $\theta_1$.

When the flexible optical fiber sensing device is nearly bent without torsion, the relationship among radius, center angle and arc length: arc length=radius×center angle, central axis length and eccentric fiber length respectively meet:

$$\begin{cases} l_0 = R_0 \cdot \beta \\ l_1 = (R_0 + r \cdot \sin\theta_1) \cdot \beta \end{cases} \quad (1)$$

In the formula (1), $l_0$ is the length of this multi-core optical fiber without bending, that is, the length of the central fiber core, $l_1$ is the eccentric fiber length at $\theta_1$ after bending. $\beta$-elimination is performed according to the formula (1) to get:

$$l_1 = \left(1 + \frac{r}{R_0}\sin\theta_1\right) \cdot l_0 = (1 + r\kappa\sin\theta_1) \cdot l_0. \quad (2)$$

The formula (2) is rewritten to a strain form:

$$\varepsilon_1 = r\kappa \sin\theta_1 \quad (3).$$

For different strain sensing optical fibers, there is $\varepsilon_i = r\kappa \sin\theta_i$ (i=1,2,3).

In order to use all strain sensing optical fibers to calculate the curvature and reduce the measurement error, the apparent curvature vector $\kappa_{a,i}$ of each strain sensing optical fiber is defined:

$$\kappa_{a,i} = \frac{\varepsilon_i}{r}(\cos\theta_i j + \sin\theta_i k). \quad (4)$$

In the formula (4), i represents the i-th fiber core, and j and k represent a pair of orthogonal unit vectors. The curvature K can be obtained by summing $\kappa_{a,i}$ of three eccentric optical fibers:

$$\kappa = \sum_{i=1}^{3} \frac{\varepsilon_i}{r}\cos\theta_i j + \sum_{i=1}^{3} \frac{\varepsilon_i}{r}\sin\theta_i k. \quad (5)$$

When the flexible optical fiber sensing device undergoes both bending and torsion, the microelement dl of the strain sensing optical fiber can be expressed as:

$$dl = [1 + r\kappa\sin(\theta_1 + \delta)] \cdot \frac{\sqrt{(r\varphi)^2 + l_0^2}}{r\varphi} \cdot r \cdot d\delta. \quad (6)$$

In the formula (6), r represents the distance between the strain sensing optical fiber and the center of the flexible optical fiber sensing device, K represents the curvature of the microelement of the sensing device, $\theta_1$ represents the included angle between the connection line between the center of the sensing device and the strain sensing optical fiber in the optical fiber slot and the normal line of the bending plane, $\phi$ represents the torsion angle of the microelement of the sensing device as torsion data, and $l_0$ represents an initial unit arc length of the flexible optical fiber sensing device, i.e., the initial unit arc length of the flexible optical fiber sensing device and the length of the multi-core optical fiber without bending are the same quantity, $\delta$ represents a position (angle) change in the horizontal direction, and its value range is $[0, \phi]$. The first term at the right end of the equal sign in the formula (6) represents the change ratio $\rho$ at different positions, and the rest represents the horizontal microelement. Integrating over $[0, \phi]$, for dl yields:

$$l = \sqrt{(r\varphi)^2 + l_0^2} + 2r\frac{\sqrt{(r\varphi)^2 + l_0^2}}{\varphi} \cdot \kappa \cdot \sin\left(\theta_1 + \frac{\varphi}{2}\right) \cdot \sin\frac{\varphi}{2}. \quad (7)$$

The formula (7) is rewritten to a strain form:

$$\varepsilon = \frac{\sqrt{(r\varphi)^2 + l_0^2} + 2r\frac{\sqrt{(r\varphi)^2 + l_0^2}}{\varphi}\kappa \cdot \sin\left(\theta_1 + \frac{\varphi}{2}\right) \cdot \sin\frac{\varphi}{2}}{l_0} - 1. \quad (8)$$

In actual measurement, $\varepsilon$ can be calculated from the measured strain, and r and $l_0$ are all known quantities, therefore, there are three unknown quantities to be solved in the formula (8): $\phi$, $\kappa$, and $\theta_1$. Therefore, the data of at least three eccentric strain sensing optical fibers are needed to solve the problem. The formula (8) is the model among the torsion angle, the curvature and optical fiber strain.

There are three sensing fibers in the sensing device, which are evenly distributed with the interval between every two sensing optical fibers is 120 degrees, the strains measured by the three sensing fibers are respectively $\varepsilon_1$, $\varepsilon_2$ and $\varepsilon_3$, the distance between the sensing optical fiber and the center of the sensing device r and the initial unit arc length of the optical fiber $l_0$ are known, and the parameters are substituted into the formula (8) yields:

$$\varepsilon_1 = \frac{\sqrt{(r\varphi)^2 + l_0^2} + 2r\frac{\sqrt{(r\varphi)^2 + l_0^2}}{\varphi} \cdot \kappa \cdot \sin\left(\theta + \frac{\varphi}{2}\right) \cdot \sin\frac{\varphi}{2}}{l_0} - 1, \quad (9)$$

$$\varepsilon_2 = \frac{\sqrt{(r\varphi)^2 + l_0^2} + 2r\frac{\sqrt{(r\varphi)^2 + l_0^2}}{\varphi} \cdot \kappa \cdot \sin\left(\theta + \frac{2\pi}{3} + \frac{\varphi}{2}\right) \cdot \sin\frac{\varphi}{2}}{l_0} - 1, \quad (10)$$

$$\varepsilon_3 = \frac{\sqrt{(r\varphi)^2 + l_0^2} + 2r\frac{\sqrt{(r\varphi)^2 + l_0^2}}{\varphi} \cdot \kappa \cdot \sin\left(\theta + \frac{4\pi}{3} + \frac{\varphi}{2}\right) \cdot \sin\frac{\varphi}{2}}{l_0} - 1. \quad (11)$$

Because there may be zero denominator in the calculation process, in order to avoid this situation, the following discussion is carried out.

(1) When $\varepsilon_1 = \varepsilon_2 = \varepsilon_3$: if E1=0, no bending or torsion occurs; if E1>0, only torsion occurs, and $$\kappa = 0, \varphi = \pm\frac{l_0}{r}\sqrt{\varepsilon_1^2 + 2\varepsilon_1}$$

obtained directly. The positive or negative of φ indicates clockwise or counterclockwise torsion.

(2) When $\varepsilon_1$, $\varepsilon_2$ and $\varepsilon_3$ are not all equal, the formula (10) and the formula (11) are differentiated from the formula (9) respectively, and $$r\frac{\sqrt{(r\varphi)^2 + l_0^2}}{\varphi} \cdot \kappa \cdot \sin\frac{\varphi}{2}$$

is eliminated to obtain:

$$(\varepsilon_2 - \varepsilon_1) \cdot \cos\left(\theta + \frac{2\pi}{3} + \frac{\varphi}{2}\right) = (\varepsilon_3 - \varepsilon_1) \cdot \cos\left(\theta + \frac{\pi}{3} + \frac{\varphi}{2}\right). \quad (12)$$

The formula (12) is solved to obtain the value of $$\theta + \frac{\varphi}{2}$$

as follows.
When $\varepsilon_2 \neq \varepsilon_3$, $$\left(\theta + \frac{\varphi}{2}\right)^* = \arctan\frac{\sqrt{3}(\varepsilon_3 + \varepsilon_2 - 2\varepsilon_1)}{3(\varepsilon_3 - \varepsilon_2)}. \quad (13)$$

In the formula (13), * in $$\left(\theta + \frac{\varphi}{2}\right)^*$$

represents that this item is the calculated value, the same below.
When $\varepsilon_2 = \varepsilon_3$, $$\begin{cases} \left(\theta + \frac{\varphi}{2}\right)^* = \frac{\pi}{2}, \varepsilon_1 > \varepsilon_2 = \varepsilon_3 \\ \left(\theta + \frac{\varphi}{2}\right)^* = -\frac{\pi}{2}, \varepsilon_1 < \varepsilon_2 = \varepsilon_3 \end{cases}. \quad (14)$$

$$\left(\theta + \frac{\varphi}{2}\right)^*$$

is substituted into the formulas (9) and (10) (if $$\varepsilon_1 = \varepsilon_2, \left(\theta + \frac{\varphi}{2}\right)^*$$

is substituted into the formulas (9) and (11)), and then make the difference between the two formulas to get the value of $$r\frac{\sqrt{(r\varphi)^2 + l_0^2}}{\varphi} \cdot \kappa \cdot \sin\frac{\varphi}{2}:$$

$$\left(r\frac{\sqrt{(r\varphi)^2 + l_0^2}}{\varphi} \cdot \kappa \cdot \sin\frac{\varphi}{2}\right)^* = \frac{\sqrt{3}(\varepsilon_2 - \varepsilon_1)l_0}{6\cos\left(\left(\theta + \frac{\varphi}{2}\right)^* + \frac{\pi}{3}\right)}. \quad (15)$$

Then, the values of $$\left(\theta + \frac{\varphi}{2}\right)^* \text{ and } \left(r\frac{\sqrt{(r\varphi)^2 + l_0^2}}{\varphi} \cdot \kappa \cdot \sin\frac{\varphi}{2}\right)^*$$

are substituted into the formula (9) to get the value of the torsion angle:

$$\varphi = \pm\frac{\sqrt{\left\{(1+\varepsilon_1)l_0 - 2\left(r\frac{\sqrt{(r\varphi)^2 + l_0^2}}{\varphi} \cdot \kappa \cdot \sin\frac{\varphi}{2}\right)^* \cdot \sin\left(\theta + \frac{\varphi}{2}\right)^+\right\}^2 - l_0^2}}{r}. \quad (16)$$

The obtained value φ is substituted into $$\left(\theta + \frac{\varphi}{2}\right)^*$$

to obtain the value of θ:

$$\theta = \left(\theta + \frac{\varphi}{2}\right)^* - \frac{\varphi}{2}. \quad (17)$$

Then, the obtained value of φ is substituted into $$r\frac{\sqrt{(r\varphi)^2 + l_0^2}}{\varphi} \cdot \kappa \cdot \sin\frac{\varphi}{2}$$

to obtain the value of κ:

$$\kappa = \frac{\left(r\frac{\sqrt{(r\varphi)^2 + l_0^2}}{\varphi} \cdot \kappa \cdot \sin\frac{\varphi}{2}\right)^*}{r\frac{\sqrt{(r\varphi)^2 + l_0^2}}{\varphi} \cdot \sin\frac{\varphi}{2}} \quad (18)$$

The above is the calculation of one microelement of the optical fiber sensing device. By applying the above process to each microelement, all K along the line of the sensing device can be obtained. The two-dimensional coordinate curve of the sensing device can be obtained by using the traditional curvature-based two-dimensional curve reconstruction algorithm.

In order to solve the connection problem between the assemblable flexible optical fiber sensing devices 18 and the inclination angle measurement problem at the connection position of the assemblable flexible optical fiber sensing devices 18, this embodiment designs the inclination angle self-sensing connection device 17.

Figure 5:
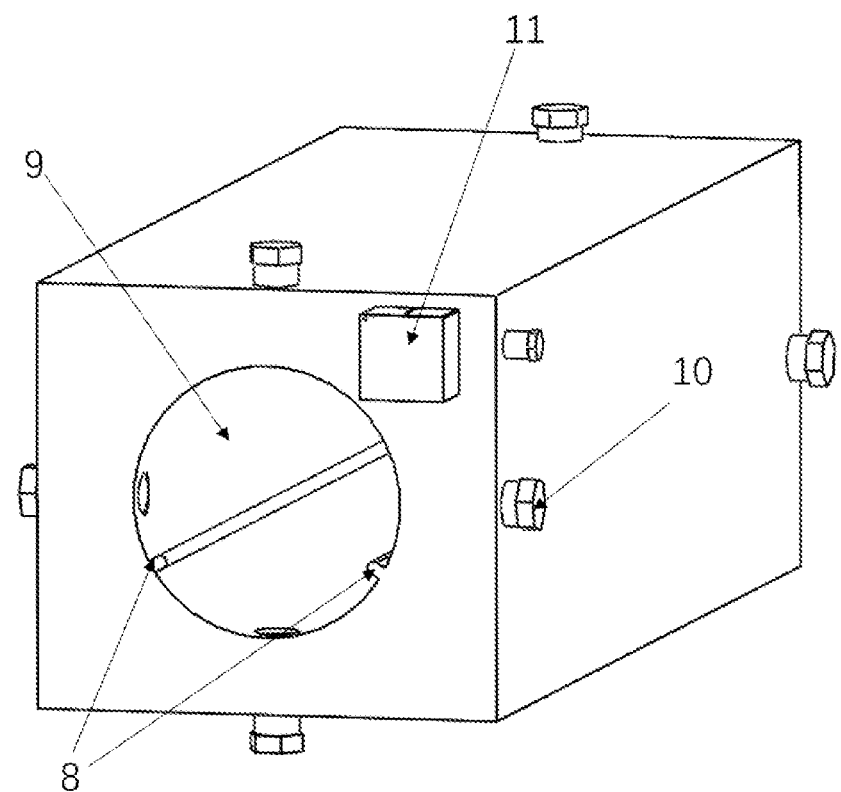
FIG. 5 illustrates a schematic structural diagram of an inclination angle self-sensing connection device according to the embodiment 1 of the disclosure.
Figure 6:
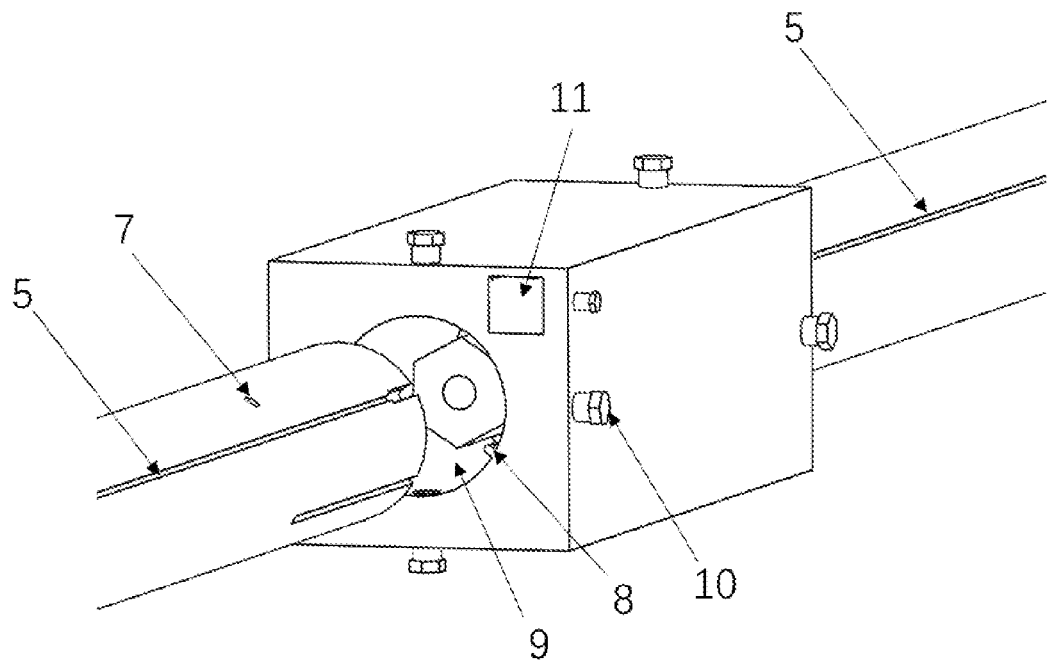
FIG. 6 illustrates a schematic structural diagram of the inclination angle self-sensing connection device connecting two sections of the assemblable flexible optical fiber sensing devices according to the embodiment 1 of the disclosure.

As shown in FIG. 1, FIG. 5 and FIG. 6, the inclination angle self-sensing connection device 17 includes fixing protrusions 8, a sensing device fixing channel 9, fastening bolts 10 (also referred to as fixing sub device or fixing member), and an inclination angle self-sensing module 11.

In order to ensure that the structure is not deformed, the inclination angle self-sensing connection device 17 is made of structural steel and is rectangular in shape. The inside of the inclination angle self-sensing connection device 17 is provided with a through cylindrical channel 9 (i.e., sensing device fixing channel), both sides of the sensing device fixing channel 9 are provided with two linear fixing protrusions 8 along the longitudinal direction, and the two fixing slots 3 of the assemblable flexible optical fiber sensing device 18 can be inserted along the fixing protrusions 8 to fix the assemblable flexible optical fiber sensing device 18 without rotation. In order to prevent the assemblable flexible optical fiber sensing device 18 from falling off the inclination angle self-sensing connection device 17, there are four threaded holes at both ends of the inclination angle self-sensing connection device 17, which are evenly distributed around the inclination angle self-sensing connection device 17. The assemblable flexible optical fiber sensing device 18 is fixed inside the inclination angle self-sensing connection device 17 by adding fixing sub-devices 10 (fastening bolts are selected in this embodiment) at both ends of the inclination angle self-sensing connection device 17.

Figure 7A:
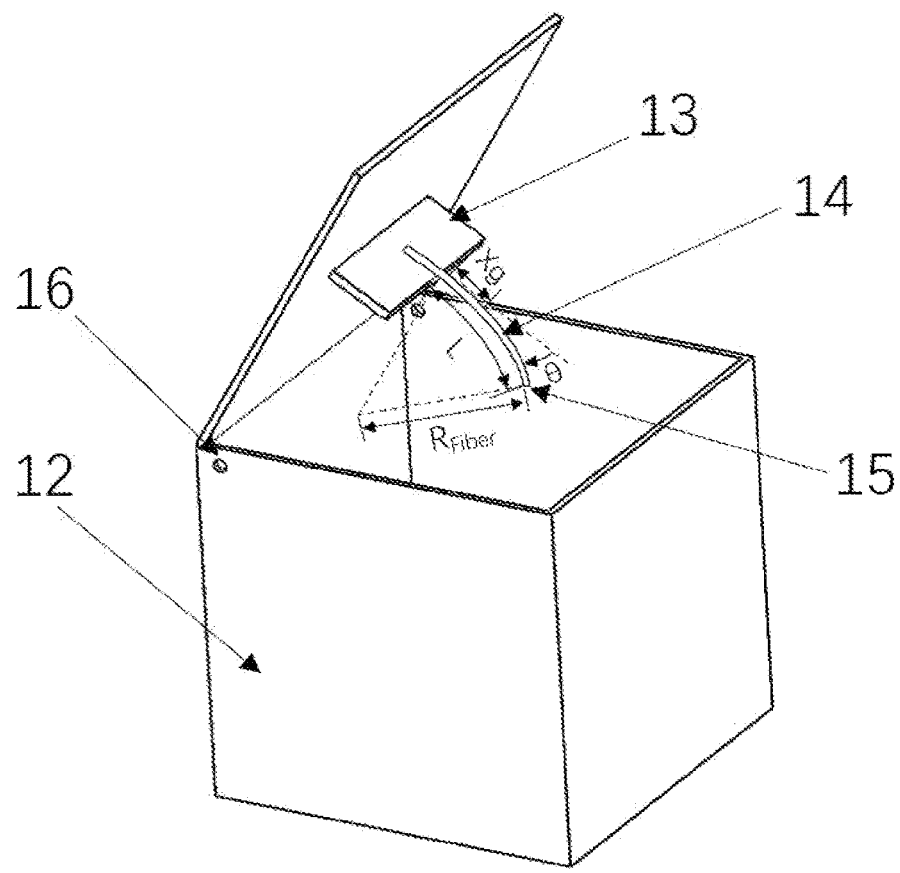
FIGS. 7A-7B illustrate schematic diagrams of a built-in inclination angle self-sensing module of the inclination angle self-sensing connection device according to the embodiment 1 of the disclosure. Specifically.
Figure 7B:
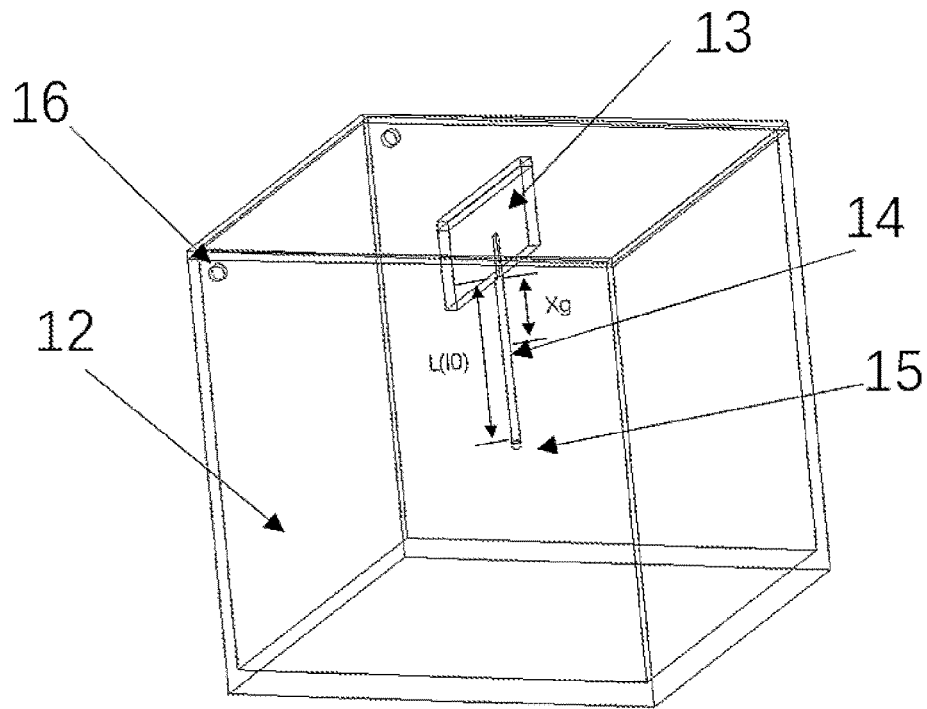
Figure 8:
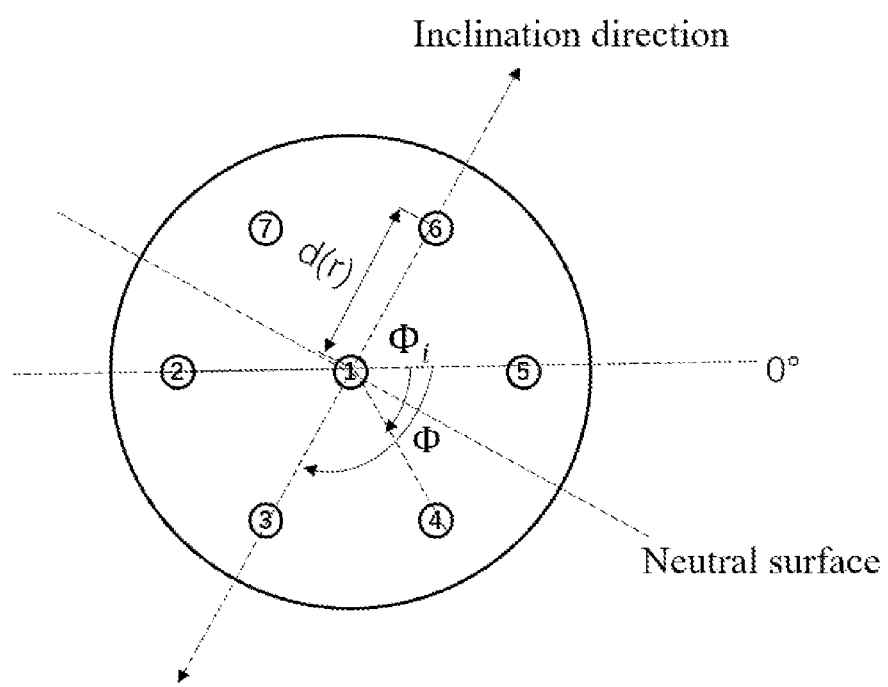
FIG. 8 illustrates a cross-sectional view of a multi-core optical fiber of the inclination angle self-sensing module according to the embodiment 1 of the disclosure.

As shown in FIG. 7 and FIG. 8, in order to measure the inclination angle data and torsion angle data at the connection position of the assemblable flexible optical fiber sensing device 18, the inclination angle self-sensing connection device 17 is designed with a built-in inclination angle sensing module 11. The inclination angle sensing module 11 includes a shell structure 12 (in this embodiment, a sensing square box is selected), an optical fiber fixing sub-device 13 (in this embodiment, an optical fiber fixing piece is selected), a multi-core optical fiber 14, a counterweight sub device 15 (in this embodiment, a counterweight ball is selected), and second optical fiber leading-out holes 16. The shell structure 12 of the inclination angle sensing module 11 adopts a flip-lid cube sensing square box, which is convenient for maintaining the internal devices of the sensing module. The square box is reserved with the second optical fiber leading-out holes 16, which is convenient for leading out the optical fiber to be connected with the optical fiber demodulator 19 through the circular hole channel 6 in the flexible optical fiber sensing device. The optical fiber fixing piece 13 is installed at the top of the sensing square box for fixing the multi-core optical fiber 14. The multi-core optical fiber is a seven-core optical fiber, including a central core and six outer cores arranged in a hexagonal shape. Fiber gratings are engraved at the same positions of all fiber cores by laser beam scanning, and the gratings are close to the fixed end of the optical fiber. The fiber grating in the central position is used as temperature compensation, and two fiber gratings in the outer cores are arbitrarily selected to be not in a straight line with the central core as inclination sensing, and according to the demand of the measurement sensitivity, the two inclination sensing gratings have a wide range of selection options. In order to increase the toughness of multi-core optical fiber, the multi-core optical fiber is inserted into the flexible fiber sleeve with good toughness, and the multi-core optical fiber is coupled with the sleeve with UV adhesive, and the free end of the multi-core optical fiber is connected to the counterweight ball 15, so that the bending amplitude of the optical fiber is increased when it is inclined.

The specific principle of inclination angle measurement of multi-core optical fiber is as follows. As shown in FIG. 8, three cores 1, 2 and 4 of the seven cores in the multi-core optical fiber are selected for sensing, the outer cores 2 and 4 are configured to stretching and compression, and the central core 1 is configured to temperature compensation. The wavelength shift of the core i can be described as:

$$\Delta\lambda_i = (1 - p_e)\lambda_i \cdot \frac{d}{R} \cdot \sin(\phi + \phi_i). \quad (19)$$

In the formula (19), $\lambda_i$ represents a Bragg wavelength of the core i of the multi-core optical fiber, and $p_e \approx 0.22$ represents the effective photoelastic coefficient, relative to the effective index of the core and the Poisson's ratio of the fiber. $\phi_i$ represents an angle position of the core i relative to a neutral surface, $\phi$ represents the azimuth angle measured by the multi-core optical fiber and is also the torsion angle at the connection position of the sensing devices, R represents a bending radius, and d represents a distance from the outer core to the central core. When the multi-core optical fiber is inclined, the counterweight ball at the free end exerts stress on the gratings of the multi-core optical fiber, resulting in a slight shift in the wavelength of the outer cores. Fiber Bragg gratings (FBGs) are located near the fixed point. When the multi-core optical fiber is inclined, the free end of the multi-core optical fiber is far away from the vertical direction, while the other end remains fixed. In this case, R consists of two parts: mass-induced $R_{Mass}$ and free fiber-induced $R_{Fiber}$, which are described in the formulas (20) and (21), respectively:

$$R_{Mass} = \frac{EI}{mg\sin\theta \cdot (x_g - L)}, \quad (20)$$

-continued $$R_{Fiber} = \frac{EI}{w \cdot \left(Lx_g - \frac{1}{2}x_g^2 - \frac{1}{2}L^2\right)}. \quad (21)$$

E represents a Young's modulus of the multi-core optical fiber, I is a second-order moment of a cross-sectional area, which is defined as $\pi D^4/64$. L represents a length of a free fiber, $x_g$ represents a distance from the fiber grating to a fixed point. w represents the weight of fiber per unit length, m represents a weight of an additional counterweight ball, g=9.8 m/s² represents gravitational acceleration, and θ represents the inclination angle of the assemblable flexible optical fiber sensing device. Therefore, the Bragg wavelength shift caused by the inclination of the core can be expressed as the formula (22):

$$\Delta\lambda_i = (1 - p_e)\lambda_i \cdot \left(\frac{d}{R_{Fiber}} + \frac{d}{R_{Mass}}\right) \cdot \sin(\phi + \phi_i). \quad (22)$$

The shift of Bragg wavelength is related to both inclination angle θ and torsion angle ϕ. When considering the wavelength shift of two outer cores, such as the core i and the core j, the azimuth angle, that is, the torsion angle between the sensing devices, can be described as:

$$\phi = \tan^{-1}\left(\frac{\frac{\Delta\lambda_i}{\lambda_i}\sin\phi_j - \frac{\Delta\lambda_j}{\lambda_j}\sin\phi_j}{\frac{\Delta\lambda_j}{\lambda_j}\cos\phi_i - \frac{\Delta\lambda_i}{\lambda_i}\cos\phi_j}\right). \quad (23)$$

It can be seen from the formula (23) that a phase between $\phi_i$ and $\phi_j$ is any value except π, which means that the two selected cores should not be in a straight line with the central core.

Therefore, once the direction of ϕ is determined, θ can be obtained from the formulas (23) and (22), which can be deduced as:

$$\theta = \sin^{-1}\left[\left(\frac{\Delta\lambda_i}{\lambda_i}\frac{1}{1-p_e}\frac{1}{\sin(\phi+\phi_i)} - \frac{d}{R_{Fiber}}\right) \times \frac{EI}{dmg(x_g - L)}\right]. \quad (24)$$

The obtained value of ϕ and the wavelength shift and inclination angle θ of the specific core can be successfully determined. Therefore, under any inclination condition, by detecting the shift of Bragg wavelength, ϕ and θ can be obtained simultaneously. The inclinometer has the ability to distinguish inclination in a two-dimensional range, in which the measured azimuth angle is also the torsion angle at the connection position of the flexible optical fiber sensing devices, and the inclination angle θ is the inclination angle at the connection position of the sensing devices.

Embodiment 2

Figure 9:
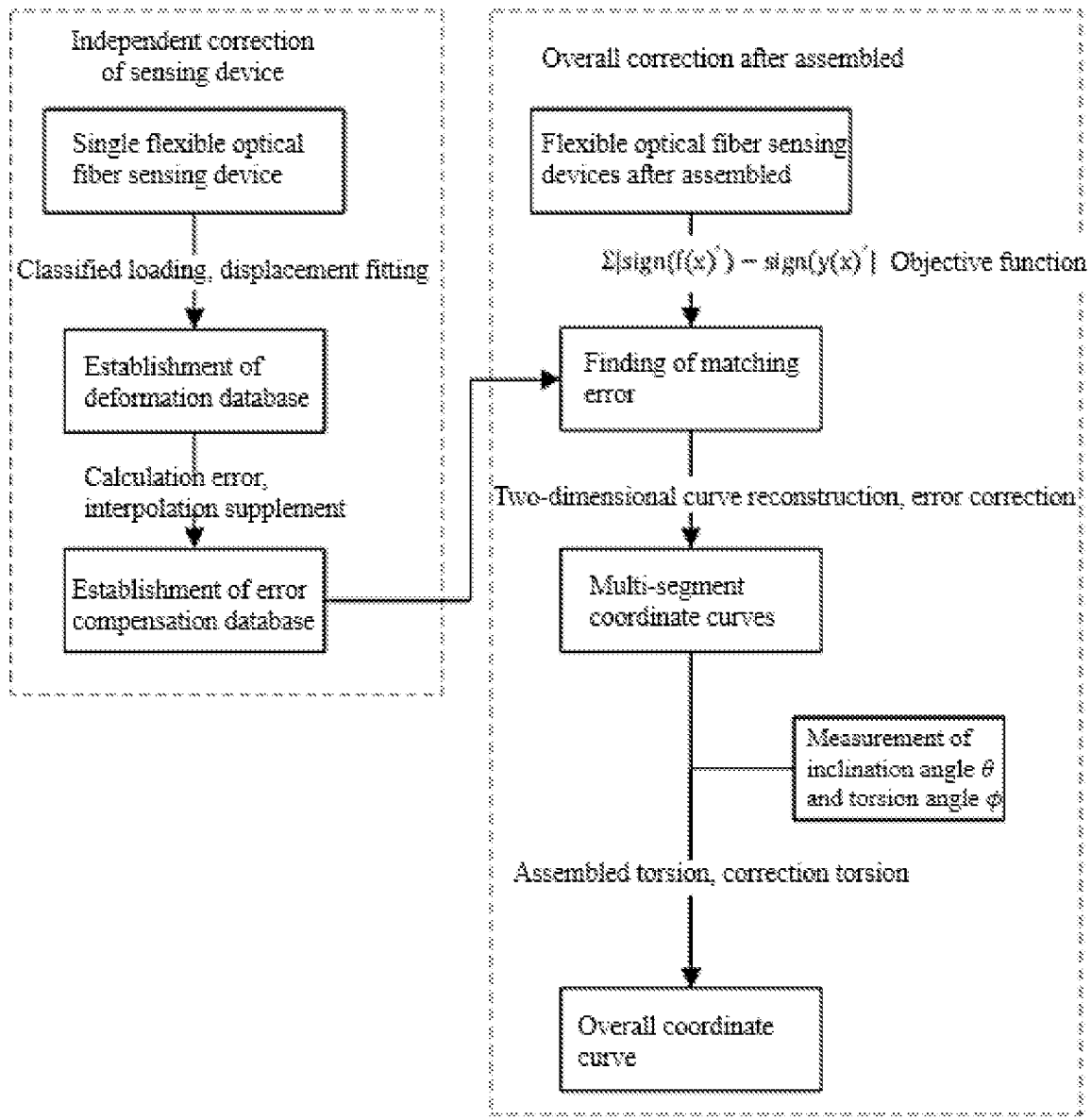
FIG. 9 illustrates a flowchart of displacement field fitting and error correction method of the assemblable optical fiber displacement field sensing system according to an embodiment 2 of the disclosure.

As shown in FIG. 9, this embodiment proposes a correction method for a self-correcting assemblable optical fiber sensing system for displacement field, which includes the steps of:

constructing an error compensation database of a single one of the assemblable flexible optical fiber sensing devices;

based on the error compensation database, performing error compensation on a two-dimensional coordinate curve fitted by each of the assemblable flexible optical fiber sensing devices and performing independent correction on a displacement curve fitted by each of the assemblable flexible optical fiber sensing devices; and assembling the plurality of assemblable flexible optical fiber sensing devices, the plurality of inclination angle self-sensing connection devices, and the optical fiber demodulation device based on a preset manner, acquiring the data of the inclination angle and the torsion angle measured by the inclination angle self-sensing connection devices through the optical fiber demodulation device after assembled, and performing whole correction on a plurality of coordinate curves fitted by the assemblable flexible optical fiber sensing devices after assembled.

In an embodiment, the constructing an error compensation database of a single one of the assemblable flexible optical fiber sensing devices includes:

constructing a deformation database without torsion of the assemblable flexible optical fiber sensing devices;

constructing the error compensation database based on the deformation database.

The constructing a deformation database without torsion of the assemblable flexible optical fiber sensing devices includes the following steps:

performing a preset deformation treatment on the assemblable flexible optical fiber sensing devices before measurement, and constructing the deformation database of each of the assemblable flexible optical fiber sensing devices based on a result of the preset deformation treatment without torsion subjected to the assemblable flexible optical fiber sensing devices.

The preset deformation treatment includes that following step: dividing deformation of the assemblable flexible optical fiber sensing devices into three kinds of boundary constraint conditions including single-end fastening, double-end fastening and double-end simply supported; and under each of the constraint conditions, considering situations of single-point multi-value loading, two-point multi-value loading and three-point multi-value loading of a central point and an eccentric point, calculating original curvature data κ under different loading situations according to the strain data.

The constructing the error compensation database based on the deformation database includes:

obtaining the two-dimensional coordinate curve of the assemblable flexible optical fiber sensing device by using a two-dimensional coordinate reconstruction algorithm for the original curvature data in the deformation database, and calculating coordinate curve error data of the assemblable flexible optical fiber sensing device; performing interpolation on the original curvature data and the coordinate curve error data of different deformation types respectively according to loading displacement to form a data volume with a preset value, and making the coordinate curve error data correspond to the original curvature data of various deformations in the deformation database to thereby establish the error compensation database.

In an embodiment, error compensation for the strain data includes:

performing derivation on the curvature data measured by the assemblable flexible optical fiber sensing devices after assembled with the original curvature data in the torsion-free deformation database to obtain a derivative curve, take a positive and negative matching degree and an Euclidean distance of the obtained derivative curve as an objective function, searching a curvature curve with the most matched deformation shape from the error compensation database by using a gradient descent algorithm, and performing the error compensation on data of the measured coordinate curves according to the corresponding coordinate curve error data in the error compensation database, so as to correct the coordinate curves fitted by the assemblable flexible optical fiber sensing devices.

In an embodiment, data of the two-axis inclination angle measured by the inclination angle self-sensing connection devices includes: $\theta_1$, $\phi_1$, $\theta_2$, $\phi_2$, $\theta_3$, $\phi_3$ . . . ; where $\theta$ represents an the inclination angle between the connection position of the assemblable flexible optical fiber sensing device and a horizontal plane, $\phi$ represents the torsion angle of the connection position of the assemblable flexible optical fiber sensing devices, and 1, 2, 3 . . . represents a first inclination angle self-sensing connection device, a second inclination angle self-sensing connection device, a third inclination angle self-sensing connection device . . . , respectively.

In an embodiment, the method further includes based on a preset correction mode, performing torsion error correction and curve splicing on the plurality of coordinate curves fitted by the assemblable flexible optical fiber sensing devices after assembled using the torsion angle $\phi$ and inclination angle $\theta$ at the connection position of the assemblable flexible optical fiber sensing devices, including:

step S1, for a first assemblable flexible optical fiber sensing device, when the first assemblable flexible sensing device is subjected to torsion, calculating a set $N_1$ of torsion data $\phi$ evenly distributed along an arc length of the first assemblable flexible optical fiber sensing device from strain data of three strain sensing optical cables in the optical fiber slots; where the set $N_1$ is a torsion data set from zero, a total variation of the torsion data of the first assemblable flexible optical fiber sensing device is represented as an end value $N_{1end}$ of the torsion data set $N_1$; obtaining a corrected torsion data set $$N_1 \frac{\phi_2 - \phi_1}{N_{1end}}$$

with an accurate total torsion variation by using a difference value $\phi_2 - \phi_1$ of the torsion angles $\phi_1$ and $\phi_2$ measured by the inclination angle self-sensing connection devices at two ends of the first assemblable flexible optical fiber sensing device as a reference of the total variation $N_{1end}$, adding the torsion angle $\phi_1$ to the corrected torsion data set $$N_1 \frac{\phi_2 - \phi_1}{N_{1end}}$$

and taking the torsion angle $\phi_1$ as an initial reference value of the torsion data set, so as to obtain a first accurate torsion angle data set $$N_1 \frac{\phi_2 - \phi_1}{N_{1end}} + \phi_1$$

of the first assemblable flexible optical fiber sensing device, calculating curvature data $\kappa$=

$$\frac{\left(r\frac{\sqrt{(r\varphi)^2 + l_0^2}}{\varphi} \cdot \kappa \cdot \sin\frac{\varphi}{2}\right)^*}{r\frac{\sqrt{(r\varphi)^2 + l_0^2}}{\varphi} \cdot \sin\frac{\varphi}{2}}$$

of the first assemblable flexible optical fiber sensing device separating a torsion error by using the torsion data $\phi$ in the first accurate torsion angle data set $$N_1 \frac{\phi_2 - \phi_1}{N_{1end}} + \phi_1;$$

translating a starting point of a first fitted coordinate curve to a coordinate origin through the curvature data $\kappa$, and rotating the translated coordinate curve around the coordinate origin through an optimization algorithm until a tangent angle of the starting point is close to the inclination angle $\theta_1$ measured by the inclination angle self-sensing connection device, taking a difference value between a tangent angle at an end of the first fitted coordinate curve and the inclination angle $\theta_2$ as an objective function; setting a variation range of a correction coefficient X1 according to different bending conditions by the first assemblable flexible optical fiber sensing device, and then randomly selecting a value from the variation range as an initial value of the correction coefficient X1, multiplying the initial value by a strain curve of the first assemblable flexible optical fiber sensing device, updating the correction coefficient X1 of the strain curve by using an optimization algorithm by taking a value of the inclination angle $\theta_2$ measured in real time as an optimization objective, until the tangent angle at the end of the first fitted coordinate curve is close to the inclination angle $\theta_2$ measured at an end of the first assemblable flexible optical fiber sensing device, so as to complete correction of the first fitted coordinate curve;

step S2, for a second assemblable flexible optical fiber sensing device, obtaining a torsion data set $$N_2 \frac{\phi_3 - \phi_2}{N_{2end}} + \phi_2$$

of the second assemblable flexible optical fiber sensing device by using the torsion angles $\phi_2$ and $\phi_3$ through operations of the step S1, calculating a curvature data $\kappa$ corresponding to the second assemblable flexible optical fiber sensing device, to fit a second coordinate curve; translating and splicing a starting point of the second coordinate curve to an end point of the first fitted coordinate curve, and rotating and adjusting a curvature correction coefficient X2 simultaneously to make tangent angles at a start point and an end of the second coordinate curve are close to the inclination angles $\theta_2$ and $\theta_3$ measured by the inclination angle self-sensing connection devices at both ends of the second assemblable flexible optical fiber sensing device, so as to complete correction of the second coordinate curve; and step S3, aiming at the coordinate curves of the assemblable flexible optical fiber sensing devices, sequentially adopting the algorithms of torsion error correction and optimization of rotation splicing matching curvature correction coefficient adjustment in the step S1, and finally forming an overall displacement curve measured by the assemblable flexible optical fiber sensing devices after assembled.

In this embodiment, a specific implementation method of the self-correcting assemblable optical fiber sensing system for the displacement field is as follows.

Step 1: before measurement, the number of required flexible optical fiber sensing devices 18 are determined according to the measured structural dimensions. Bending experiments are conducted for the flexible optical fiber sensing devices 18, including dividing deformation of the flexible optical fiber sensing devices 18 into three kinds of boundary constraint conditions including single-end fastening, double-end fastening and double-end simply supported; and under each of the constraint conditions, considering situations of single-point multi-value loading, two-point multi-value loading and three-point multi-value loading of a central point and an eccentric point, original curvature data under different loading situations according to the strain data is calculated and measured coordinate curves are recorded, and a deformation database for each flexible optical fiber sensing device 18 is established.

Step 2, a two-dimensional curve reconstruction algorithm is used to obtain a two-dimensional coordinate curve of the sensing device from curvature data obtained in the deformation database, and coordinate curve error data of the sensing device at this time is calculated. Strain data and error data of different deformation types are interpolated respectively according to loading displacement to form a rich data volume, and the coordinate curve error data corresponds to the original curvature data of various deformations in the deformation database to establish an error compensation database.

Step 3: the flexible optical fiber sensing devices 18 in a certain number are assembled according to the requirements of a measured structure, and the assembled positions are fixed with inclination angle self-sensing connection devices 17, and the flexible optical fiber sensing devices 18 after assembled are installed with the connection devices 17 at both ends for measuring the inclination angles of both ends; the flexible optical fiber sensing devices 18 after assembled are mounted on the measured structure.

Step 4: the strain data of each of flexible optical fiber sensing devices 18 is obtained through a demodulator, curvature data is calculated, the calculated curvature data is derived from the curvature data (i.e., original curvature data) in the correction coefficient database (i.e., deformation database), a positive and negative matching degree and an Euclidean distance of the obtained derivative curve are taken as an objective function, the curvature curve with the best matching deformation shape is found from the error compensation database using a gradient descent algorithm, and measured data of the coordinate curves is performed with error compensation according to the corresponding coordinate curve error data in the error compensation database, so as to correct the coordinate curves fitted by the assemblable flexible optical fiber sensing devices.

Step 5: after the coordinate curves measured by each of the sensing devices are corrected, data of the two-axis inclination angle measured by each inclination angle self-sensing connection device are obtained by the demodulator, including $\theta_1, \phi_1, \theta_2, \phi_2, \theta_3, \phi_3 \ldots$; where $\theta$ represents an included angle between the connection position of the assemblable flexible optical fiber sensing device and a horizontal plane, $\phi$ represents the torsion angle of the connection position of the assemblable flexible optical fiber sensing device, and 1, 2, 3 . . . represents a first inclination angle self-sensing connection device, a second inclination angle self-sensing connection device, a third inclination angle self-sensing connection device . . . , respectively. Firstly, for the first assemblable flexible optical fiber sensing device, when the first assemblable flexible sensing device is subjected to torsion, a set $N_1$ of torsion data $\phi$ evenly distributed along an arc length of the first assemblable flexible optical fiber sensing device is calculated from strain data of three strain sensing optical cables in the optical fiber slots. The set $N_1$ is a torsion data set from zero, a total variation of the torsion data of the first assemblable flexible optical fiber sensing device is represented as an end value $N_{1end}$ of the torsion data set $N_1$. In this situation, a corrected torsion data set $$N_1 \frac{\phi_2 - \phi_1}{N_{1end}}$$

with an accurate total torsion variation is obtained by using a difference value $\phi_2 - \phi_1$ of the torsion angles $\phi_1$ and $\phi_2$ measured by the inclination angle self-sensing connection devices at two ends of the first assemblable flexible optical fiber sensing device as a reference of the total variation of the torsion data $N_{1end}$. The torsion angle $\phi_1$ is added to the corrected torsion data set $$N_1 \frac{\phi_2 - \phi_1}{N_{1end}}$$

and the torsion angle $\phi_1$ is taken as an initial reference value of the torsion data set, so as to obtain a first accurate torsion angle data set $$N_1 \frac{\phi_2 - \phi_1}{N_{1end}} + \phi_1$$

of the first assemblable flexible optical fiber sensing device, Curvature data $$\kappa = \frac{\left(r\frac{\sqrt{(r\varphi)^2 + l_0^2}}{\varphi} \cdot \kappa \cdot \sin\frac{\varphi}{2}\right)^*}{r\frac{\sqrt{(r\varphi)^2 + l_0^2}}{\varphi} \sin\frac{\varphi}{2}}$$

of the first assemblable flexible optical fiber sensing device separating a torsion error is calculated by using the torsion data $\phi$ in the first accurate torsion angle data set $$N_1 \frac{\phi_2 - \phi_1}{N_{1end}} + \phi_1.$$

A starting point of a first fitted coordinate curve is translated to a coordinate origin through the curvature data κ, and the translated coordinate curve is rotated around the coordinate origin through an optimization algorithm until a tangent angle of the starting point is close to the inclination angle $\theta_1$ measured by the inclination angle self-sensing connection device. Taking a difference value between a tangent angle at an end of the first fitted coordinate curve and the inclination angle $\theta_2$ as an objective function, a variation range of a correction coefficient X1 is set according to different bending conditions by the first assemblable flexible optical fiber sensing device, and then a value from the variation range is randomly selected as an initial value of the correction coefficient X1, the initial value is multiplied by a strain curve of the first assemblable flexible optical fiber sensing device, the correction coefficient X1 of the strain curve is updated by using an optimization algorithm by taking a value of the inclination angle $\theta_2$ measured in real time as an optimization objective, until the tangent angle at the end of the first fitted coordinate curve is close to the inclination angle $\theta_2$ measured at an end of the first assemblable flexible optical fiber sensing device, so as to complete correction of the first fitted coordinate curve.

Step 6: for a second assemblable flexible optical fiber sensing device, a torsion data set $$N_2 \frac{\phi_3 - \phi_2}{N_{2end}} + \phi_2$$

of the second assemblable flexible optical fiber sensing device is obtained by using the torsion angles $\phi_2$ and $\phi_3$ through operations of the step S1, a curvature data $\kappa$ corresponding to the second assemblable flexible optical fiber sensing device is calculated, to fit a second coordinate curve. A starting point of the second coordinate curve is translated and spliced to an end point of the first fitted coordinate curve, and a curvature correction coefficient X2 is rotated and adjusted simultaneously to make tangent angles at a start point and an end of the second coordinate curve are close to the inclination angles $\theta_2$ and $\theta_3$ measured by the inclination angle self-sensing connection devices at both ends of the second assemblable flexible optical fiber sensing device, so as to complete correction of the second coordinate curve.

Step 7: aiming at the coordinate curves of the assemblable flexible optical fiber sensing devices, the algorithms of torsion error correction and optimization of rotation splicing matching curvature correction coefficient adjustment in the step S1 are sequentially adopted, and an overall displacement curve measured by the assemblable flexible optical fiber sensing devices after assembled is finally formed.

What is claimed is:

1. A self-correcting assemblable optical fiber sensing system for a displacement field, comprising: a plurality of assemblable flexible optical fiber sensing devices, a plurality of inclination angle self-sensing connection devices, and an optical fiber demodulation device;
   wherein the assemblable flexible optical fiber sensing device is configured to measure the displacement field;
   wherein the inclination angle self-sensing connection device is configured to connect the assemblable flexible optical fiber sensing devices and measure an inclination angle and a torsion angle at a connection position of the assembled flexible optical fiber sensing devices;
   wherein the optical fiber demodulation device is configured to acquire strain data of the assemblable flexible optical fiber sensing devices and data of the inclination angle and the torsion angle measured by the inclination angle self-sensing connection device, and correct the displacement field measured by the assemblable flexible optical fiber sensing devices after assembled;
   wherein the plurality of assemblable flexible optical fiber sensing devices are connected between the plurality of inclination angle self-sensing connection devices, and the optical fiber demodulation device is connected to a free end of the inclination angle self-sensing connection device;
   wherein the assemblable flexible optical fiber sensing device comprises a protruding connector, a connecting groove, fixing slots, optical fiber joint accommodating slots, optical fiber slots, an optical fiber channel, and first optical fiber leading-out holes;
      the protruding connector and the connecting groove are respectively located at two ends of the assemblable flexible optical fiber sensing device, and the protruding connector is adapted to the connecting groove;
      the assemblable flexible optical fiber sensing device is provided with three of the optical fiber slots at equal intervals along a circumferential direction, and an inner center of the assemblable flexible optical fiber sensing device is provided with the optical fiber channel;
      the two ends of the assemblable flexible optical fiber sensing device are respectively symmetrically provided with the fixing slots and the first optical fiber leading-out holes, and the fixing slots are symmetrically distributed based on the optical fiber channel;
      each of the optical fiber slots is internally embedded with a strain sensing optical fiber, and the strain sensing optical fiber is sealed with epoxy resin and is configured to monitor displacement information and torsion information of the assemblable flexible optical fiber sensing device;
      two ends of each of the optical fiber slots are provided with the optical fiber joint accommodating slots, and a depth of the optical fiber joint accommodating slot is greater than that of each of the optical fiber slots;
      the optical fiber channel is internally provided with a temperature compensation optical fiber; the temperature compensation optical fiber is in a loose state and is not affected by strain, and is configured to perform temperature compensation on the strain sensing optical fiber;
   wherein the inclination angle self-sensing connection device comprises fixing protrusions, a sensing device fixing channel, fixing members and an inclination angle self-sensing module;
      the inclination angle self-sensing connection device is internally provided with the sensing device fixing channel, the fixing protrusions are symmetrically arranged on two sides of the sensing device fixing channel, and the fixing protrusions are matched with the fixing slots respectively;
      the fixing members are located at two ends of the inclination angle self-sensing connection device and configured to fix the assemblable flexible optical fiber sensing device inside the inclination angle self-sensing connection device;
      the inclination angle self-sensing module is located at one side of the inclination angle self-sensing connection device, is capable of self-sensing two-axis inclination angle, and is configured to measure the data of the inclination angle and the data of the torsion angle at the connection position of the assemblable flexible optical fiber sensing devices;
      the inclination angle self-sensing module comprises a cavity, a surface of the cavity is provided with second optical fiber leading-out holes, and the cavity is provided with an optical fiber fixing sub-device on a top of an inner side of the cavity;

the optical fiber fixing sub-device is connected to an end of a multi-core optical fiber, and another end of the multi-core optical fiber is fixedly connected to a counterweight sub-device, and the counterweight sub-device is configured to increase bending amplitude of the multi-core optical fiber when the multi-core optical fiber is inclined;

wherein the multi-core optical fiber comprises a central core, a plurality of outer cores, and fiber gratings engraved at same positions of all of the central core and the plurality of outer cores;

the fiber grating at the position of the central core is configured to perform temperature compensation;

two of the fiber gratings at the positions of the plurality of outer cores are arbitrarily selected to be not in a straight line with the central core and are configured to acquire the torsion angle and the inclination angle between the assemblable flexible optical fiber sensing devices after assembled;

the torsion angle is represented as:

$$\phi = \tan^{-1}\left(\frac{\frac{\Delta\lambda_i}{\lambda_i}\sin\phi_j - \frac{\Delta\lambda_j}{\lambda_j}\sin\phi_i}{\frac{\Delta\lambda_j}{\lambda_j}\cos\phi_i - \frac{\Delta\lambda_i}{\lambda_i}\cos\phi_j}\right),$$

where $\lambda_i$ represents a Bragg wavelength of a core i of the multi-core optical fiber, $\lambda_j$ represents a Bragg wavelength of a core j of the multi-core optical fiber, $\phi_i$ represents an angle position of the core i relative to a neutral surface, $\phi_j$ represents an angle position of the core j relative to the neutral surface, and a phase between $\phi_i$ and $\phi_j$ is any value except $\pi$;

the inclination angle is represented as:

$$\theta = \sin^{-1}\left[\left(\frac{\Delta\lambda_i}{\lambda_i}\frac{1}{1-p_e}\frac{1}{\sin(\phi+\phi_i)} - \frac{d}{R_{Fiber}}\right) \times \frac{EI}{dmg(x_g - L)}\right],$$

where $\theta$ represents the inclination angle of the assemblable flexible optical fiber sensing device, $\lambda_i$ represents the Bragg wavelength of the core i of the multi-core optical fiber, $\phi_i$ represents the angle position of the core i relative to the neutral surface, $\phi$ represents the torsion angle between the assemblable flexible optical fiber sensing devices, E represents a Young's modulus of the multi-core optical fiber, I is a second-order moment of a cross-sectional area, L represents a length of a free fiber, $x_g$ represents a distance from the fiber grating to a fixed point, m represents a weight of an additional counterweight ball, g represents gravitational acceleration, d represents a distance from the outer core to the central core, $p_e$ represents an effective photoelastic coefficient, $R_{Fiber}$ represents a bending radius caused by the free fiber, and $x_g$ and L are incapable of being equivalent to each other.

2. A correction method applied to the self-correcting assemblable optical fiber sensing system for the displacement field according to claim 1, comprising:

constructing an error compensation database of a single one of the assemblable flexible optical fiber sensing devices;

based on the error compensation database, performing error compensation on a two-dimensional coordinate curve fitted by each of the assemblable flexible optical fiber sensing devices and performing independent correction on a displacement curve fitted by each of the assemblable flexible optical fiber sensing devices; and assembling the plurality of assemblable flexible optical fiber sensing devices, the plurality of inclination angle self-sensing connection devices, and the optical fiber demodulation device based on a preset manner, acquiring the data of the inclination angle and the torsion angle measured by the inclination angle self-sensing connection devices through the optical fiber demodulation device after assembled, and performing whole correction on a plurality of coordinate curves fitted by the assemblable flexible optical fiber sensing devices after assembled.

3. The correction method according to claim 2, wherein the constructing an error compensation database of a single one of the assemblable flexible optical fiber sensing devices comprises:

constructing a deformation database without torsion of the assemblable flexible optical fiber sensing devices;

constructing the error compensation database based on the deformation database;

wherein the constructing a deformation database without torsion of the assemblable flexible optical fiber sensing devices comprises:

performing a preset deformation treatment on the assemblable flexible optical fiber sensing devices before measurement, and constructing the deformation database of each of the assemblable flexible optical fiber sensing devices based on a result of the preset deformation treatment without torsion subjected to the assemblable flexible optical fiber sensing devices;

wherein the preset deformation treatment comprises: dividing deformation of the assemblable flexible optical fiber sensing devices into three kinds of boundary constraint conditions including single-end fastening, double-end fastening and double-end simply supported; and under each of the boundary constraint conditions, considering situations of single-point multi-value loading, two-point multi-value loading and three-point multi-value loading of a central point and an eccentric point, calculating original curvature data $$\kappa_0 = \sum_{i=1}^{3}\frac{\varepsilon_i}{r}\cos\theta_i j + \sum_{i=1}^{3}\frac{\varepsilon_i}{r}\sin\theta_i k$$

under different loading situations according to the strain data and recording measured coordinate curves, where $\varepsilon_i$ represents a strain of the core i of the multi-core optical fiber, r represents a distance between the strain sensing optical fiber and the center of the assemblable flexible optical fiber sensing device, $\theta_i$ represents an inclination angle between a connection line between the assemblable flexible optical fiber sensing device and the core i and a normal line of a bending plane, and j and k represent a pair of orthogonal unit vectors:

wherein the constructing the error compensation database based on the deformation database comprises:

obtaining the two-dimensional coordinate curve of the assemblable flexible optical fiber sensing device by using a two-dimensional coordinate reconstruction algorithm for the original curvature data in the deformation database, and calculating coordinate curve error data of the assemblable flexible optical fiber sensing device; performing interpolation on the original curvature data and the coordinate curve error data of different deformation types respectively according to loading displacement to form a data volume with a preset value, and making the coordinate curve error data correspond to the original curvature data of various deformations in the deformation database to thereby establish the error compensation database.

4. The correction method according to claim 3, further comprising: performing the error compensation on curvature data comprises:
  performing derivation on the curvature data measured by the assemblable flexible optical fiber sensing devices after assembled with the original curvature data in the deformation database to obtain a derivative curve, taking a positive and negative matching degree and an Euclidean distance of the obtained derivative curve as an objective function, searching a curvature curve with a most matched deformation shape from the error compensation database by using a gradient descent algorithm, and performing the error compensation on data of the measured coordinate curves according to the corresponding coordinate curve error data in the error compensation database, so as to correct the plurality of coordinate curves fitted by the assemblable flexible optical fiber sensing devices.

5. The correction method according to claim 4, wherein data of the two-axis inclination angle measured by the inclination angle self-sensing connection devices comprises: $\theta_1, \phi_1, \theta_2, \phi_2, \theta_3, \phi_3 \ldots$; where 1, 2, 3 ... represents a first inclination angle self-sensing connection device, a second inclination angle self-sensing connection device, a third inclination angle self-sensing connection device ..., respectively.

6. The correction method according to claim 5, further comprising:
  based on a preset correction mode, performing torsion error correction and curve splicing on the plurality of coordinate curves fitted by the assemblable flexible optical fiber sensing devices after assembled using the torsion angle $\phi$ and the inclination angle $\theta$ at the connection position of the assemblable flexible optical fiber sensing devices, comprising:
    step S1, for a first assemblable flexible optical fiber sensing device, when the first assemblable flexible sensing device is subjected to torsion, calculating a set $N_1$ of torsion data $\varphi$ evenly distributed along an arc length of the first assemblable flexible optical fiber sensing device from strain data of three strain sensing optical cables in the optical fiber slots; wherein the set $N_1$ is a torsion data set from zero, a total variation of the torsion data of the first assemblable flexible optical fiber sensing device is represented as an end value $N_{1end}$ of the torsion data set $N_1$; obtaining a corrected torsion data set $$N_1 \frac{\phi_2 - \phi_1}{N_{1end}}$$

with an accurate total torsion variation by using a difference value $\phi_2 - \phi_1$ of the torsion angles $\phi_1$ and $\phi_2$ measured by the inclination angle self-sensing connection devices at two ends of the first assemblable flexible optical fiber sensing device as a reference of the total variation $N_{1end}$, adding the torsion angle $\phi_1$ to the corrected torsion data set $$N_1 \frac{\phi_2 - \phi_1}{N_{1end}}$$

and taking the torsion angle $\phi_1$ as an initial reference value of the torsion data set, so as to obtain a first accurate torsion angle data set $$N_1 \frac{\phi_2 - \phi_1}{N_{1end}} + \phi_1$$

of the first assemblable flexible optical fiber sensing device, calculating curvature data $$\kappa = \frac{\left(r \frac{\sqrt{(r\phi)^2 + l_0^2}}{\phi} \cdot \kappa \sin \frac{\phi}{2}\right)^*}{r \frac{\sqrt{(r\phi)^2 + l_0^2}}{\phi} \sin \frac{\phi}{2}}$$

of the first assemblable flexible optical fiber sensing device separating a torsion error by using the torsion data $\varphi$ in the first accurate torsion angle data set $$N_1 \frac{\phi_2 - \phi_1}{N_{1end}} + \phi_1;$$

where $l_0$ represents the arc length, and * represents a calculated value of the item $$\left(r \frac{\sqrt{(r\phi)^2 + l_0^2}}{\phi} \cdot \kappa_0 \cdot \sin \frac{\phi}{2}\right);$$

translating a starting point of a first fitted coordinate curve to a coordinate origin through the curvature data $\kappa$, and rotating the translated coordinate curve around the coordinate origin through an optimization algorithm until a tangent angle of the starting point is close to the inclination angle $\theta_1$ measured by the inclination angle self-sensing connection device, taking a difference value between a tangent angle at an end of the first fitted coordinate curve and the inclination angle $\theta_2$ as an objective function; setting a variation range of a correction coefficient X1 according to different bending conditions by the first assemblable flexible optical fiber sensing device, and then randomly selecting a value from the variation range as an initial value of the correction coefficient X1, multiplying the initial value by a strain curve of the first assemblable flexible optical fiber sensing device, updating the correction coefficient X1 of the strain curve by using an optimization algorithm by taking a value of the inclination angle $\theta_2$ measured in real time as an optimization objective, until the tangent angle at the end of the first fitted coordinate curve is close to the inclination angle $\theta_2$ measured at an end of the first assemblable flexible optical fiber sensing device, so as to complete correction of the first fitted coordinate curve;

step S2, for a second assemblable flexible optical fiber sensing device, obtaining a torsion data set $$N_2 \frac{\phi_3 - \phi_2}{N_{2end}} + \phi_2$$

of the second assemblable flexible optical fiber sensing device by using the torsion angles $\phi_2$ and $\phi_3$ through operations of the step S1, calculating a curvature data κ corresponding to the second assemblable flexible optical fiber sensing device, to fit a second coordinate curve; translating and splicing a starting point of the second coordinate curve to an end point of the first fitted coordinate curve, and rotating and adjusting a curvature correction coefficient X2 simultaneously to make tangent angles at a start point and an end of the second coordinate curve are close to the inclination angles $\theta_2$ and $\theta_3$ measured by the inclination angle self-sensing connection devices at both ends of the second assemblable flexible optical fiber sensing device, so as to complete correction of the second coordinate curve; where $N_2$ represents is the torsion data set from $\phi_2$, of the second assemblable flexible optical fiber sensing device, and a total variation of the torsion data of the second assemblable flexible optical fiber sensing device is represented as an end value $N_{2end}$ a of the torsion data set $N_2$; and step S3, aiming at the coordinate curves of the assemblable flexible optical fiber sensing devices, sequentially adopting the algorithms of torsion error correction and optimization of rotation splicing matching curvature correction coefficient adjustment in the step S1, and finally forming an overall displacement curve measured by the assemblable flexible optical fiber sensing devices after assembled.

\* \* \* \* \*